United States Patent
Gong et al.

(10) Patent No.: US 11,057,761 B2
(45) Date of Patent: Jul. 6, 2021

(54) CLOUD SIM CARD MANAGEMENT SERVER, BINDING DEVICE, MANAGEMENT METHOD, BINDING METHOD AND SYSTEM

(71) Applicant: SHENZHEN UCLOUDLINK NEW TECHNOLOGY CO., LTD., Shenzhen (CN)

(72) Inventors: Zhihui Gong, Shenzhen (CN); Wen Gao, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/821,949

(22) Filed: Mar. 17, 2020

(65) Prior Publication Data

US 2020/0322782 A1 Oct. 8, 2020

Related U.S. Application Data

(63) Continuation-in-part of application No. PCT/CN2019/070547, filed on Jan. 5, 2019.

(30) Foreign Application Priority Data

Apr. 13, 2018 (CN) .......................... 201810333213.4

(51) Int. Cl.
*H04W 8/18* (2009.01)
*H04W 8/20* (2009.01)
*H04W 88/18* (2009.01)

(52) U.S. Cl.
CPC ............ *H04W 8/183* (2013.01); *H04W 8/205* (2013.01); *H04W 88/18* (2013.01)

(58) Field of Classification Search
CPC ...... H04W 8/183; H04W 8/205; H04W 88/18
See application file for complete search history.

(56) References Cited

U.S. PATENT DOCUMENTS

| 10,135,678 | B2* | 11/2018 | Chakrabarti | ...... H04W 12/0609 |
| 2012/0020394 | A1* | 1/2012 | Shi | ......................... H04W 76/11 |
| | | | | 375/222 |
| 2013/0023235 | A1* | 1/2013 | Fan | ......................... H04W 4/50 |
| | | | | 455/411 |
| 2015/0017950 | A1* | 1/2015 | Zhao | ....................... H04W 8/20 |
| | | | | 455/411 |

(Continued)

FOREIGN PATENT DOCUMENTS

| CN | 106454820 A | 2/2017 |
| CN | 106878987 A | 6/2017 |
| CN | 108769978 A | 11/2018 |

*Primary Examiner* — Dominic E Rego
(74) *Attorney, Agent, or Firm* — Robert L. Stearns; Dickinson Wright, PLLC

(57) ABSTRACT

The present disclosure provides a SIM card management server, a binding device, a management method, a binding method and a binding system. By allocating a cloud SIM card and the network access information to an intelligent terminal of a user, so that the network access information of the original SIM card is replaced to acquire service from a carrier's network, and resource is conserved, the user is facilitated in flexibly replacing a cloud SIM card to access a network, and a system management of cloud SIM card is facilitated.

4 Claims, 3 Drawing Sheets

(56) References Cited

U.S. PATENT DOCUMENTS

| | | | |
|---|---|---|---|
| 2015/0171910 A1* | 6/2015 | Gao | H04L 63/0884 |
| | | | 455/406 |
| 2016/0007188 A1* | 1/2016 | Wane | H04M 15/56 |
| | | | 455/419 |
| 2016/0050556 A1* | 2/2016 | Zhao | H04W 48/18 |
| | | | 455/432.1 |
| 2016/0309326 A1* | 10/2016 | Lian | H04W 12/04 |
| 2017/0135099 A1* | 5/2017 | Song | H04W 16/02 |
| 2017/0280313 A1* | 9/2017 | Zhu | H04W 8/183 |
| 2018/0041893 A1* | 2/2018 | Guo | H04W 12/06 |
| 2018/0146421 A1* | 5/2018 | Zhang | H04W 12/06 |
| 2018/0152937 A1* | 5/2018 | Wen | H04W 12/0802 |
| 2018/0176976 A1* | 6/2018 | Liu | H04W 8/205 |
| 2018/0367983 A1* | 12/2018 | Lou | H04W 8/183 |

\* cited by examiner

CLOUD SIM CARD MANAGEMENT SERVER, BINDING DEVICE, MANAGEMENT METHOD, BINDING METHOD AND SYSTEM

CROSS-REFERENCE TO RELATED APPLICATION

This application is a Continuation-In-Part application of PCT Patent Application Ser. No. PCT/CN2019/070547, filed on Jan. 5, 2019, which claims priority to Chinese Patent Application Ser. No. CN201810333213.4, filed on Apr. 13, 2018, the entire disclosures of which are incorporated herein by reference in their entireties.

TECHNICAL FIELD

The present disclosure relates to the field of mobile communications, and more particularly to a cloud SIM card management server, a binding device, a cloud SIM card management method, a binding method and a system.

BACKGROUND

With the rapid progress of mobile communication technical field, the application of intelligent terminal (e.g., mobile phone) is increasingly deeper into every aspect of our lives, services can be acquired from a telecom carrier's network through a user identification module by arranging a user identification module (e.g., a SIM card or a Universal SIM card) in the intelligent terminal.

In the existing cloud SIM card management method, due to the fact that a SIM card is not bound with any account of the telecom carrier in a manufacturing process, the activated network access information is bound with a specific account by the carrier in a SIM card activation process, so that a system management of the SIM card is facilitated.

However, the conventional SIM card management method is generally unintelligent, since network access information of one SIM card is fixed, one SIM card may only be allocated to one user, this user has to re-activate a new SIM card so as to acquire services from the telecom carrier's network again, and the previously activated SIM card cannot be activated again, so that a waste of resources is prone to be caused. It is obvious that, SIM cards cannot be allocated and managed flexibly in the traditional SIM card management method, and a problem of a waste of resources of SIM card is prone to be caused.

SUMMARY

An embodiment of the present disclosure provides a cloud SIM card management server, which aims at solving a problem that the traditional SIM card management method cannot flexibly allocate and manage cloud SIM card, and a waste of resource of cloud SIM card is prone to be caused.

The embodiments of the present disclosure further provide a SIM card management method, being applied in a server, comprising steps of:

acquiring a cloud SIM allocation request sent from a user terminal by the server, wherein the allocation request carries device identification information;

acquiring a cloud SIM card and network access information in a system database and storing the device identification information, the cloud SIM card and the network access information in association by the server; and transmitting the cloud SIM card and the network access information to the user terminal by the server.

The embodiments of the present disclosure further provide a cloud SIM card binding method, being applied in a user terminal, comprising:

transmitting a cloud SIM card allocation request to a server by the user terminal, wherein the cloud SIM card allocation request carries device identification information; and receiving a cloud SIM card and network access information sent from the server and storing the cloud SIM card and the network access information by the user terminal.

The embodiments of the present disclosure further provide a cloud SIM card management system, comprising a cloud SIM card management server and a user terminal;

where the cloud SIM card management server is configured to acquire a cloud SIM allocation request sent from the user terminal, to acquire a cloud SIM card and network access information in a system database according to the cloud SIM card allocation request, and to store the device identification information, the cloud SIM card and the network access information in association, where the allocation request carries device identification information;

the cloud SIM card management server is further configured to transmit the cloud SIM card and the network access information acquired from the system database to the user terminal to be stored.

In the cloud SIM card management server provided by the embodiments of the present disclosure, in the cloud SIM card management server 110 provided by the embodiments of the present disclosure, in the process of activating the cloud SIM card by the user, the cloud SIM card allocation request sent by the user terminal is acquired by the cloud SIM card management server 110, the allocation request carries the device identification information; a cloud SIM card and the network access information are acquired by the cloud SIM card management server 110 from the system database, and the device identification information, the cloud SIM card and the network access information are stored in association, so that the cloud SIM card is bound with the device identifier, and a system management of cloud SIM cards is facilitated; the cloud SIM card and the network access information are transmitted to the user terminal by the cloud SIM card management server 110, so that the user terminal is enabled to access the network according to the cloud SIM card and the network access information so as to complete acquiring services from the carrier's network. When the user needs to activate or replace a cloud SIM card, a cloud SIM card and network access information in the system database are allocated to an intelligent terminal of a user by the cloud SIM card management server 110, so that the network access information of the original SIM card is replaced to acquire service from the carrier's network; in one aspect, due to the fact that the SIM card is a cloud SIM card, a problem of a waste of resources caused to because that the physical SIM card cannot be activated again is avoided; in another aspect, the network access information of the cloud SIM card may be modified, so that the user can flexibly replace the cloud SIM card to access the network; moreover, the allocated network access information and the network access information of the user have been stored in association in the cloud SIM card management server 110, so that a system synchronization of the cloud SIM card allocation information is facilitated, a dynamic management of the cloud SIM card is realized, and a cloud SIM card management efficiency is effectively improved.

BRIEF DESCRIPTION OF THE DRAWINGS

For a more complete understanding of the present disclosure, reference should now be made to the embodiments illustrated in greater detail in the accompanying drawings and described below by way of examples of the present disclosure.

DETAILED DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

In the cloud SIM (Subscriber Identity Module) card management server provided by the embodiment of the present disclosure, a cloud SIM card and network access information are distributed in the system to an intelligent terminal of a user, so that the network access information of the original SIM card is replaced to acquire service from the carrier's network to save resource, and the user can flexibly replace a cloud SIM card to access the network, and a system management of cloud SIM card is facilitated.

Figure 1:
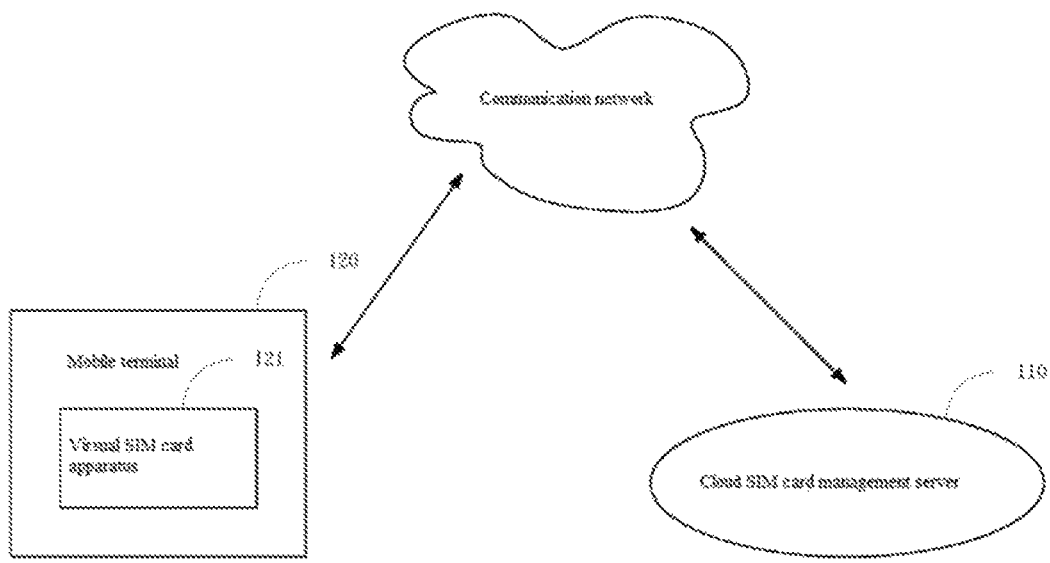
FIG. 1 depicts a network architecture diagram of a cloud SIM card management system provided by an embodiment of the present disclosure.

FIG. 1 depicts a network architecture diagram of a cloud SIM card management system provided by an embodiment of the present disclosure, for the convenience of description, the portion relevant to the present disclosure are merely illustrated. A cloud SIM card management server 110 and a mobile terminal 120 which communicates with the cloud SIM card management server 110 through a communication network are included.

In this embodiment of the present disclosure, the communication network may be a GSM (Global System for Mobile Communication), WCDMA (Wideband Code Division Multiple Access), LTE (Long Term Evolution) network, or other configuration, the communication network is not limited herein.

Where the cloud SIM card management server 110 may be a server, and may also be a server cluster comprised of several servers, or be a cloud computing service center that can store and process data.

Additionally, the mobile terminal 120 is at least provided with a virtual SIM card device 121 configured to store cloud SIM card information and cloud SIM network access information.

Embodiment One

The cloud SIM card management server 110 is configured to acquire a cloud SIM card allocation request sent by a user terminal, where the allocation request carries device identification information.

In this embodiment of the present disclosure, the user terminal is configured to communicate with the server over a communication network, the user terminal may be an intelligent terminal such as a mobile phone, the user terminal may also be a shared network terminal, such as a portable Wi-Fi (Wireless Fidelity), it should be understood that, the examples of the user terminal described herein are merely for facilitating understanding, the present disclosure is not limited thereto, and the examples of the user terminal may be selected according to the actual situation.

In this embodiment of the present disclosure, the device identification information is used to identify the user terminal so as to distinguish from different users when cloud SIM cards are registered and activated by users, the device identification information may be IMEI (International Mobile Equipment Identity), and may also be an identity card number of a user, it should be understood that, the examples of the device identification information are merely for facilitating understanding, the present disclosure is not limited thereto as long as the present disclosure achieves identifying the mobile user in the mobile communication network, the examples of the device identification information may be selected according to the actual situation.

In one embodiment, the cloud SIM card management server 110 is further configured to acquire a cloud SIM card and network access information from a system database, and store the device identification information, the cloud SIM card and the network access information in association.

In this embodiment of the present disclosure, the system database is configured to store the cloud SIM card to be allocated and the network access information.

In this embodiment of the present disclosure, the network access information is used to access the mobile communication network, the network access information may be IMSI (International Mobile Subscriber Identification Number), and may also be IMEI (International Mobile Equipment Identity), APN (Access Point Name), service configuration, etc. It should be understood that the examples of the network access information are merely for facilitating understanding, the present disclosure is not limited thereto as long as accessing of the mobile communication network is achieved, the network access information may be selected according to the actual situation.

In this embodiment of the present disclosure, the cloud SIM card may be a physical SIM card, or be a soft SIM card, or be other type of SIM card (e.g., an e-SIM card, a multi-IMSI card, etc.) disposed at a server side; it should be understood that the present disclosure is not limited thereto, the examples of the cloud SIM card are merely for facilitating understanding, the cloud SIM card may be selected according to actual situation.

As a preferable embodiment of the present disclosure, when the cloud SIM card is a physical SIM card arranged at the server side, files of SIM card are downloaded by the terminal, when network authentication is performed, the operation of network authentication is completed by performing an interaction with a remote server.

As another preferable embodiment of the present disclosure, when the cloud SIM card is a soft SIM card, this soft SIM card is a complete software version of the physical card at the server side, so that the intelligent terminal of the user is allowed to freely switch the carrier's smart card.

In this embodiment of the present disclosure, after the cloud SIM card allocation request is acquired by the server, a cloud SIM card and network access information may be acquired from the system database, and the device identification information, the cloud SIM card and the network access information are stored in association, so that a dynamic binding of these information is realized.

In a preferable embodiment of the present disclosure, the cloud SIM card management server 110 is further configured to judge whether the cloud SIM card allocation request also carries with a network access information request identifier.

In a preferable embodiment of the present disclosure, the cloud SIM card management server 110 is further configured to acquire a cloud SIM card to be allocated in the system database and take the device identification information as the network access information, if the judgment is that the cloud SIM card allocation request doesn't carry the flag for requesting network access information.

As an alternative, the cloud SIM card management server 110 is configured to acquire a cloud SIM card to be allocated and the network access information in the system database and store the device identification information, the cloud SIM card and the network access information in association, if the judgment is that the cloud SIM card allocation request carries the flag for requesting network access information.

In this embodiment of the present disclosure, the cloud SIM card to be allocated refers to a cloud SIM card which does not carry device identification information.

In this embodiment of the present disclosure, the terminal identification information may identify each user terminal device due to its uniqueness, thus, when the cloud SIM card allocation request as sent by the user terminal carries terminal identification information, the terminal identification information is used as the device identification information, so that a system management of the cloud SIM card is simplified, an application of the cloud SIM card becomes flexible, and a problem that a processing amount of data information is huge due to the fact that too much network access information is allocated and thus a cloud SIM card management efficiency is low is avoided.

In a preferable embodiment of the present disclosure, the cloud SIM card management server 110 is configured to transmit the cloud SIM card and the network access information to the user terminal.

In the cloud SIM card management server 110 provided by the embodiments of the present disclosure, in the process of activating the cloud SIM card by the user, the cloud SIM card allocation request sent by the user terminal is acquired by the cloud SIM card management server 110, the allocation request carries the device identification information; the cloud SIM card and the network access information are acquired from the system database, and the device identification information, the cloud SIM card and the network access information are stored in association, so that the cloud SIM card is bound with the device identifier, and a system management of cloud SIM cards is facilitated; the cloud SIM card and the network access information are transmitted to the user terminal, so that the user terminal is enabled to access the network according to the cloud SIM card and the network access information so as to complete acquiring services from the carrier's network. When the user needs to activate or replace a cloud SIM card, a cloud SIM card and network access information in the system database are allocated to the user intelligent terminal by the cloud SIM card management server 110, so that the network access information of the original SIM card is replaced to acquire service from the carrier's network; in one aspect, due to the fact that the SIM card is a cloud SIM card, a problem of a waste of resources caused to because that the physical SIM card cannot be activated again is avoided; in another aspect, the network access information of the cloud SIM card may be modified, so that the user can flexibly replace the cloud SIM card to access the network; moreover, the allocated network access information and the network access information of the user have been stored in association in the cloud SIM card management server 110, so that a system synchronization of the cloud SIM card allocation information is facilitated, a dynamic management of the cloud SIM card is realized, and a cloud SIM card management efficiency is effectively improved.

Embodiment Two

Embodiment two discloses a mobile terminal 120 that is configured to transmit a cloud SIM card allocation request to a cloud SIM card management server 110, where the cloud SIM card allocation request carries device identification information.

In the embodiment of the present disclosure, the device identification information is used to identify the user terminal so as to distinguish from different users when cloud SIM cards are registered and activated by users, the device identification information may be IMEI (International Mobile Equipment Identity), and may also be an identity card number of a user, it should be understood that, the examples of the device identification information are merely for facilitating understanding, the present disclosure is not limited thereto as long as the present disclosure achieves identifying the mobile user in the mobile communication network, the examples of the device identification information may be selected according to the actual situation.

As a preferable embodiment of the present disclosure, the cloud SIM card allocation request also carries service type information.

In this embodiment of the present disclosure, the service type information refers to the service type which is acquired by a registered user from the carrier's network, such as the carrier type, the type of consumption hierarchy, the type of access network, etc.

In this embodiment of the present disclosure, the service type information is carried in the cloud SIM card allocation request, so that a cloud SIM card more suitable for the user may be allocated to the user according to the service type information of the user when the cloud SIM card and the network access information in the system database is allocated by the server, and the user experience is effectively improved.

In a preferable embodiment of the present disclosure, the mobile terminal 120 is configured to receive the cloud SIM card and the network access information sent by the cloud SIM card management server 110, and store the cloud SIM card and the network access information.

In this embodiment of the present disclosure, the cloud SIM card may be a physical SIM card, or be a soft SIM card, or be other type of SIM card (e.g., an e-SIM card, a multi-IMSI card, etc.) disposed at a server side; it should be understood that the present disclosure is not limited thereto, the examples of the cloud SIM card are merely for facilitating understanding, the cloud SIM card may be selected according to actual situation.

As a preferable embodiment of the present disclosure, when the cloud SIM card is a physical SIM card arranged at the server side, files of SIM card are downloaded by the terminal, when network authentication is performed, the operation of network authentication is completed by performing an interaction with a remote server.

As an another preferable embodiment of the present disclosure, when the cloud SIM card is a soft SIM card, this soft SIM card is a complete software version of the physical card at the server side, so that the intelligent terminal of the user is allowed to freely switch the carrier's smart card.

In the cloud SIM card binding device provided by the embodiment of the present disclosure, the mobile terminal 120 is used to transmit the cloud SIM card allocation request to the server, the cloud SIM card allocation request carries the device identification information; the cloud SIM card and the network access information allocated by the cloud SIM card management server 110 according to the cloud SIM card allocation request are received by the mobile terminal 120; since the device identification information, the cloud SIM card and the network access information are stored in association, the mobile terminal 120 is enabled to access the network according to the network access information; in one aspect, due to the fact that the SIM card is a cloud SIM card, a problem of a waste of resources caused to because that the physical SIM card cannot be activated again is avoided; in another aspect, since the network access information of the cloud SIM card may be modified, so that the user can flexibly replace the cloud SIM card to access the network; moreover, the allocated network access information and the network access information of the user have been stored in association in the cloud SIM card management server 110, a system synchronization of the cloud SIM card allocation information is facilitated, and a cloud SIM card management efficiency is effectively improved.

Embodiment Three

Figure 2:
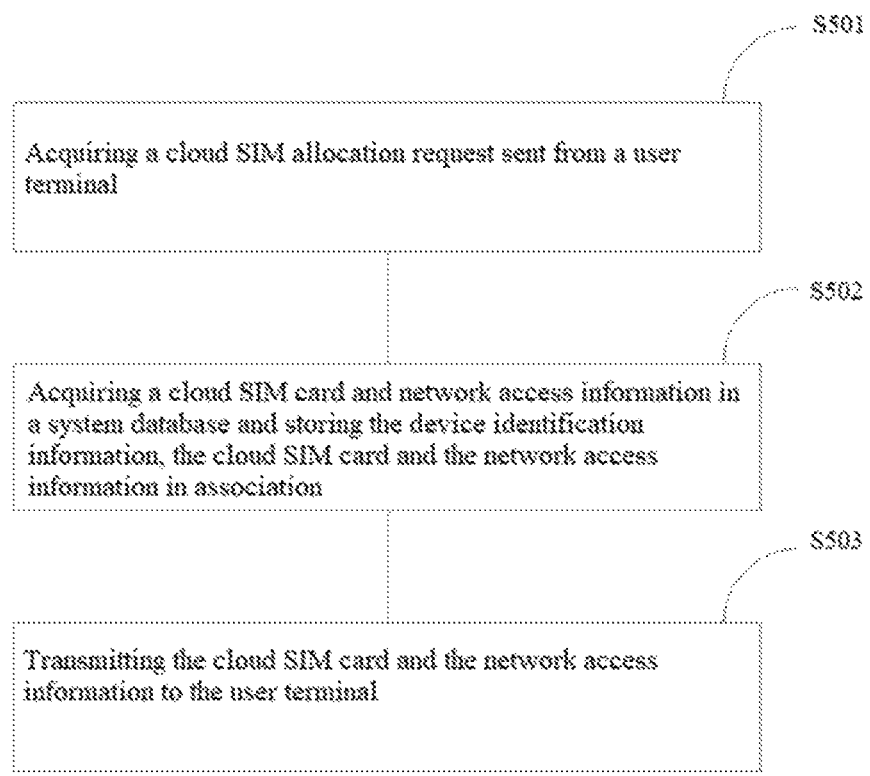
FIG. 2 depicts a schematic block diagram of a cloud SIM card management method provided by embodiment three of the present disclosure.

FIG. 2 illustrates a schematic block diagram of a cloud SIM card management method provided by embodiment three of the present disclosure, where the cloud SIM card management method is performed on a cloud SIM card management server 110, for the convenience of description, the portion relevant to the present disclosure is merely illustrated.

In step 501, acquiring, by the cloud SIM card management server 110, a cloud SIM card allocation request sent from a user terminal, where the cloud SIM card allocation request carries device identification information.

In this embodiment of the present disclosure, the user terminal is configured to communicate with the server through a communication network, the user terminal may be an intelligent terminal such as a mobile phone, the user terminal may also be a shared network terminal, such as a portable Wi-Fi (Wireless Fidelity), it should be understood that, the examples of the user terminal described herein are merely for facilitating understanding, the present disclosure is not limited thereto, and the examples of the user terminal may be selected according to the actual situation.

In the embodiment of the present disclosure, the device identification information is used to identify the user terminal so as to distinguish from different users when cloud SIM cards are registered and activated by users, the device identification information may be IMEI (International Mobile Equipment Identity), and may also be an identity card number of a user; it should be understood that, the examples of the device identification information are merely for facilitating understanding, the present disclosure is not limited thereto as long as the present disclosure achieves identifying the mobile user in the mobile communication network, the examples of the device identification information may be selected according to the actual situation.

In step 502, acquiring a cloud SIM card and network access information in the system database, and storing the device identification information, the cloud SIM card and the network access information in association by the cloud SIM card management server 110.

In this embodiment of the present disclosure, the system database is configured to store the cloud SIM card to be allocated and the network access information.

In this embodiment of the present disclosure, the network access information is used to access the mobile communication network, the network access information may be IMSI (International Mobile Subscriber Identification Number), and may also be IMEI (International Mobile Equipment Identity), APN (Access Point Name), service configuration, etc. It should be understood that the examples of the network access information are merely for facilitating understanding, the present disclosure is not limited thereto as long as accessing of the mobile communication network is achieved, the network access information may be selected according to the actual situation.

In this embodiment of the present disclosure, the cloud SIM card may be a physical SIM card, or be a soft SIM card, or be other type of SIM card (e.g., an e-SIM card, a multi-IMSI card, etc.) disposed at a server side, it should be understood that the present disclosure is not limited thereto, the examples of the cloud SIM card are merely for facilitating understanding, the cloud SIM card may be selected according to actual situation.

As a preferable embodiment of the present disclosure, when the cloud SIM card is a physical SIM card disposed at the server side, files of SIM card are downloaded by the terminal, when network authentication is performed, the operation of network authentication is completed by performing an interaction with a remote server.

As an another preferable embodiment of the present disclosure, when the cloud SIM card is a soft SIM card, this soft SIM card is a complete software version of the physical card at the server side, so that the intelligent terminal of the user is allowed to freely switch the carrier's smart card.

In this embodiment of the present disclosure, after the cloud SIM card allocation request is acquired by the cloud SIM card management server 110, a cloud SIM card and network access information may be acquired from the system database, and the device identification information, the cloud SIM card and the network access information are stored in association, so that binding of these information is realized.

Figure 3:
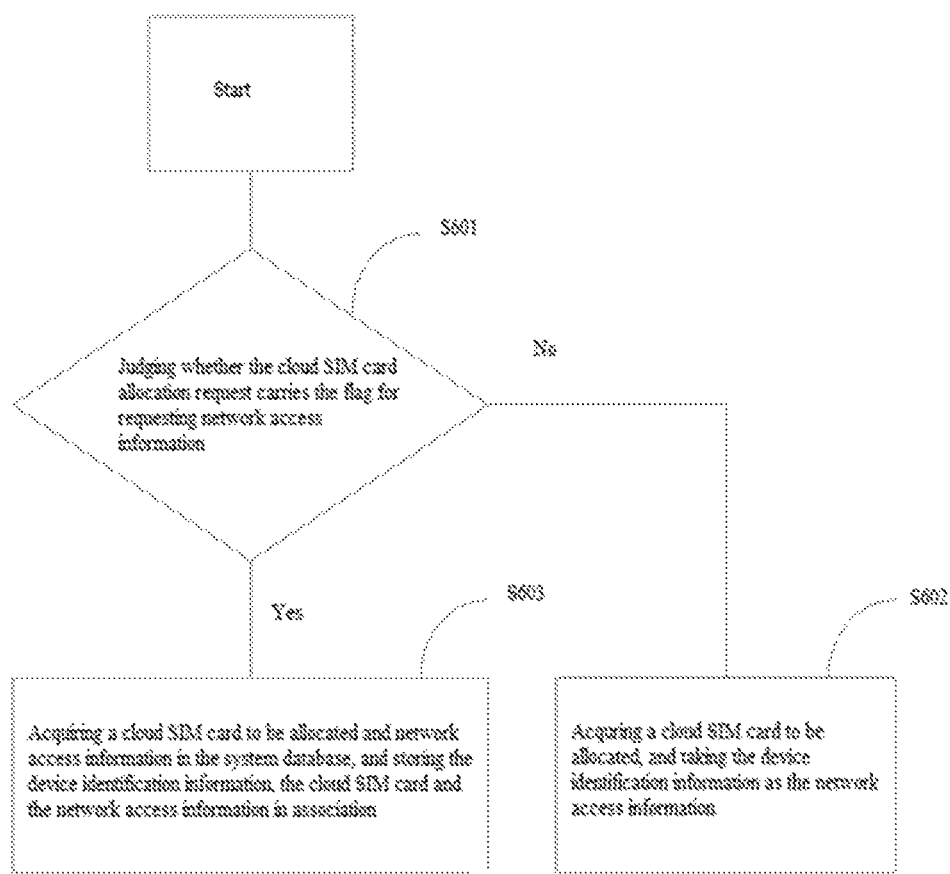
FIG. 3 depicts a schematic block diagram of acquiring a cloud SIM card and network access information provided by embodiment three of the present disclosure.

As a preferable embodiment of the present disclosure, FIG. 3 illustrates a schematic block diagram of acquiring a cloud SIM card and network access information provided by embodiment three of the present disclosure, for the convenience of description, the portion relevant to the present disclosure is merely illustrated.

In step 601, judging whether the cloud SIM card allocation request carries the flag for requesting network access information by the cloud SIM card management server 110.

The flag for requesting network access information indicates whether the user terminal needs to acquire the network access information corresponding to the cloud SIM card in the server.

In step 602, acquiring a cloud SIM card to be allocated in the system database and taking the device identification information as the network access information by the cloud SIM card management server 110, if the judgment is that the cloud SIM card allocation request doesn't carry the flag for requesting network access information.

In step 603, acquiring a cloud SIM card to be allocated and the network access information in the system database, and storing the device identification information, the cloud SIM card and the network access information in association by the cloud SIM card management server 110, if the judgment is that the cloud SIM card allocation request carries the flag for requesting network access information.

In this embodiment of the present disclosure, the cloud SIM card to be allocated refers to a cloud SIM card which does not carry device identification information.

In this embodiment of the present disclosure, the terminal identification information may identify each user terminal device due to its uniqueness, thus, when the cloud SIM card allocation request as sent by the user terminal carries terminal identification information, the terminal identification information is used as the device identification information, so that a system management of the cloud SIM card is simplified, an application of the cloud SIM card becomes flexible, and a problem that a processing amount of data information is huge due to the fact that too much network access information is allocated, and a cloud SIM card management efficiency is low is avoided.

In step 603, transmitting the information acquired in step 602 to the user terminal by the cloud SIM card management server 110.

In the cloud SIM card management server 110 provided by the embodiments of the present disclosure, in the process of activating the cloud SIM card by the user, the cloud SIM card allocation request which is sent by the user terminal is acquired by the cloud SIM card management server 110, the cloud SIM card allocation request carries the device identification information; a cloud SIM card and the network access information are acquired from the system database, and the device identification information, the cloud SIM card and the network access information are stored in association, so that the cloud SIM card is bound with the device identifier, and a system management of cloud SIM cards is facilitated; the cloud SIM card and the network access information are transmitted to the user terminal, so that the user terminal is enabled to access the network according to the cloud SIM card and the network access information so as to complete acquiring services from the carrier's network. When the user needs to activate or replace a cloud SIM card, a cloud SIM card and network access information in the system database are allocated to the user intelligent terminal by the server, so that the network access information of the original SIM card is replaced to acquire service from the carrier's network; in one aspect, due to the fact that the SIM card is a cloud SIM card, a problem of a waste of resources caused to because that the physical SIM card cannot be activated again is avoided; in another aspect, the network access information of the cloud SIM card may be modified, so that the user can flexibly replace the cloud SIM card to access the network; moreover, the allocated network access information and the network access information of the user have been stored in association in the server, so that a system synchronization of the cloud SIM card allocation information is facilitated, a dynamic management of the cloud SIM card is realized, and a cloud SIM card management efficiency is effectively improved.

Embodiment Four

Figure 4:
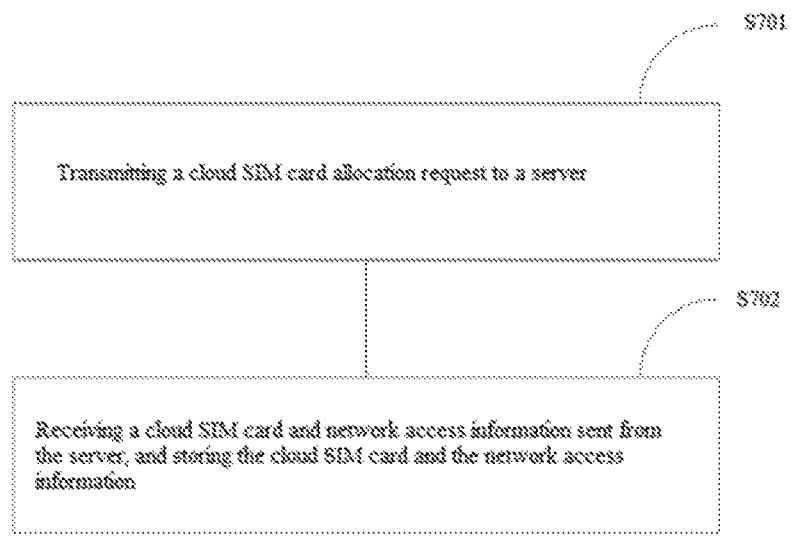
FIG. 4 depicts a schematic block diagram of a cloud SIM card binding method provided by embodiment four of the present disclosure.

FIG. 4 illustrates a schematic block diagram of a cloud SIM card binding method provided by embodiment four of the present disclosure, for the convenience of description, the portion relevant to the present disclosure is illustrated.

In step 701, transmitting a cloud SIM card allocation request to a cloud SIM card management server 110 by a mobile terminal 120, where the cloud SIM card allocation request carries device identification information.

In the embodiment of the present disclosure, the device identification information is used to identify the user terminal so as to distinguish from different users when cloud SIM cards are registered and activated by users, the device identification information may be IMEI (International Mobile Equipment Identity), and may also be an identity card number of a user, it should be understood that, the examples of the device identification information are merely for facilitating understanding, the present disclosure is not limited thereto as long as the present disclosure achieves identifying the mobile user in the mobile communication network, the examples of the device identification information may be selected according to the actual situation.

As a preferable embodiment of the present disclosure, the cloud SIM card allocation request also carries service type information.

In this embodiment of the present disclosure, the service type information refers to the service type which is acquired by a registered user from the carrier's network, such as the carrier type, the type of consumption hierarchy, the type of access network, etc.

In this embodiment of the present disclosure, the service type information is carried in the cloud SIM card allocation request, so that a cloud SIM card more suitable for the user may be allocated to the user according to the service type information of the user when the cloud SIM card and the network access information in the system database is allocated by the server, and the use experience is effectively improved.

In step 702, receiving the cloud SIM card and the network access information sent by the cloud SIM card management server 110, and storing the cloud SIM card and the network access information by the mobile terminal 120.

In this embodiment of the present disclosure, the cloud SIM card may be a physical SIM card, or be a soft SIM card, or be other type of SIM card (e.g., an e-SIM card, a multi-IMSI card, etc.) disposed at a server side; it should be understood that, the examples of the cloud SIM card are merely for facilitating understanding, the present disclosure is not limited thereto, the cloud SIM card may be selected according to actual situation.

As a preferable embodiment of the present disclosure, when the cloud SIM card is a physical SIM card arranged at the server side, files of SIM card are downloaded by the terminal, when network authentication is performed, the operation of network authentication is completed by performing an interaction with a remote server.

As an another preferable embodiment of the present disclosure, when the cloud SIM card is a soft SIM card, this soft SIM card is a complete software version of the physical card at the server side, so that the intelligent terminal of the user is allowed to freely switch the carrier's smart card.

In the cloud SIM card binding method provided by the embodiment of the present disclosure, the cloud SIM card allocation request is transmitted to the cloud SIM card management server 110, the cloud SIM card allocation request carries the device identification information, and the cloud SIM card and the network access information which are allocated by the cloud SIM card management server 110 according to the cloud SIM card allocation request are received; the user terminal is enabled to access the network according to the network access information due to the fact that the device identification information, the cloud SIM card and the network access information are stored in association; in one aspect, since the SIM card is a cloud SIM card, a problem of a waste of resources caused to because that the physical SIM card cannot be activated again is avoided; in another aspect, since the network access information of the cloud SIM card may be modified, so that the user can flexibly replace the cloud SIM card to access the network; moreover, the allocated network access information and the network access information of the user have been stored in association in the cloud SIM card management server 110, a system synchronization of the cloud SIM card allocation information is facilitated, and a cloud SIM card management efficiency is effectively improved.

Embodiment Five

Figure 5:
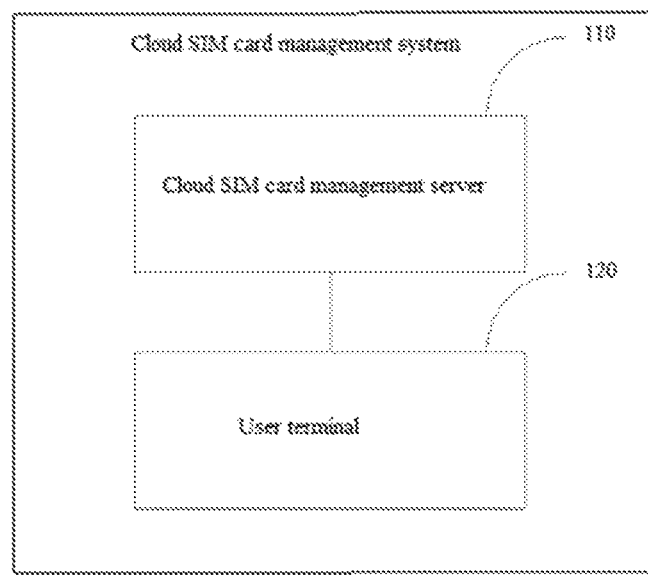
FIG. 5 depicts a schematic structural diagram of a cloud SIM card management system provided by embodiment five of the present disclosure.

FIG. 5 illustrates a schematic structural diagram of a cloud SIM card management system provided by embodiment five of the present disclosure, for the convenience of description, the portion relevant to the present disclosure are merely illustrated.

The s

As stated above, in the cloud SIM card management server 110 provided by the embodiments of the present disclosure, in the process of activating the cloud SIM card by the user, the cloud SIM card allocation request sent by the user terminal is acquired by the cloud SIM card management server 110, the allocation request carries the device identification information; a cloud SIM card and the network access information are acquired by the cloud SIM card management server 110 from the system database, and the device identification information, the cloud SIM card and the network access information are stored in association, so that the cloud SIM card is bound with the device identifier, and a system management of cloud SIM cards is facilitated; the cloud SIM card and the network access information are transmitted to the user terminal by the cloud SIM card management server 110, so that the user terminal is enabled to access the network according to the cloud SIM card and the network access information so as to complete acquiring services from the carrier's network. When the user needs to activate or replace a cloud SIM card, a cloud SIM card and network access information in the system database are allocated to an intelligent terminal of a user by the cloud SIM card management server 110, so that the network access information of the original SIM card is replaced to acquire service from the carrier's network; in one aspect, due to the fact that the SIM card is a cloud SIM card, a problem of a waste of resources caused to because that the physical SIM card cannot be activated again is avoided; in another aspect, the network access information of the cloud SIM card may be modified, so that the user can flexibly replace the cloud SIM card to access the network; moreover, the allocated network access information and the network access information of the user have been stored in association in the cloud SIM card management server 110, so that a system synchronization of the cloud SIM card allocation information is facilitated, a dynamic management of the cloud SIM card is realized, and a cloud SIM card management efficiency is effectively improved.

The person of ordinary skill in the art may be aware of that, a whole or part of steps for implementing the cloud SIM card management method in the embodiments of the present disclosure may be accomplished by a hardware, and may also be accomplished by using a computer program to instruct relevant hardware, this computer program is stored in a computer readable storage medium which may be ROM (Read-Only Memory), magnetic disk, optical disk, and so on.

As stated above, the above-described embodiments are merely intended to explain but not to limit the technical solutions of the present disclosure. Although the present disclosure has been explained in detail with reference to the embodiments as mentioned above, it should be understood by the person of ordinary skill in the art that, the technical solutions described in each of the above-described embodiments can still be amended, or some technical features in the technical solutions may be replaced equivalently; these amendments or equivalent replacements, which won't make the essence of corresponding technical solution to be broken away from the spirit and the scope of the technical solution in various embodiments of the present disclosure, should all be included in the protection scope of the present disclosure.

What is claimed is:

1. A SIM card management method applied to a server, comprising:

acquiring a cloud SIM allocation request sent from a user terminal by the server, wherein the allocation request carries device identification information;

acquiring a cloud SIM card and network access information in a system database and storing the device identification information, the cloud SIM card and the network access information in association by the server; and transmitting the cloud SIM card and the network access information to the user terminal by the server;

wherein the step of acquiring a cloud SIM card and network access information in a system database by the server specifically comprises:

judging whether the cloud SIM card allocation request carries flag for requesting network access information by the server;

acquiring the cloud SIM card in the system database and taking the device identification information as the network access information by the server, if a judgment is that the cloud SIM card allocation request doesn't carry the flag for requesting network access information; and acquiring a cloud SIM card to be allocated and the network access information in the system database, and storing the device identification information, the cloud SIM card to be allocated and the network access information in association by the server, if a judgment is that the cloud SIM card allocation request carries the flag for requesting network access information.

2. A cloud SIM card binding method applied to a user terminal, comprising:

transmitting a cloud SIM card allocation request to a server by the user terminal in order that the server judges whether the cloud SIM card allocation request carries a flag for requesting network access information, and acquires a cloud SIM card to be allocated in a system database and takes the device identification information as the network access information if the judgment is that the cloud SIM card allocation request doesn't carry the flag for requesting network access information, or acquires a cloud SIM card to be allocated and the network access information in the system database, and stores the device identification information, the cloud SIM card and the network access information in association if the judgment is that the cloud SIM card allocation request carries the flag for requesting network access information wherein the flag for requesting network access information indicates whether the user terminal needs to acquire the network access information corresponding to the cloud SIM card in the server; and wherein the cloud SIM card allocation request carries device identification information;

and receiving a cloud SIM card and network access information sent from the server and storing the cloud SIM card and the network access information by the user terminal.

3. The cloud SIM card binding method according to claim 2, wherein the cloud SIM card allocation request also carries service type information.

4. A cloud SIM card management system, comprising a cloud SIM card management server and a user terminal;

wherein the cloud SIM card management server is configured to acquire a cloud SIM allocation request sent from the user terminal, to judge whether the cloud SIM card allocation request carries a flag for requesting network access information, acquire a cloud SIM card to be allocated in a system database and take the device identification information as the network access information, if the judgment is that the cloud SIM card allocation request doesn't carry the flag for requesting network access information;

the cloud SIM card management server is further configured to acquire a cloud SIM card to be allocated and the network access information in the system database and store the device identification information, the cloud SIM card and the network access information in association, if the judgment is that the cloud SIM card allocation request carries the flag for requesting network access information;

wherein the flag for requesting network access information indicates whether the user terminal needs to acquire the network access information corresponding to the cloud SIM card in the cloud SIM card management server, and wherein the allocation request carries device identification information;

the cloud SIM card management server is further configured to transmit the cloud SIM card and the network access information acquired from the system database to the user terminal to be stored.

\* \* \* \* \*